US012560812B2

(12) United States Patent
von Spiegel et al.

(10) Patent No.: US 12,560,812 B2
(45) Date of Patent: Feb. 24, 2026

(54) APPARATUS FOR GENERATING A VIRTUAL IMAGE HAVING A VARIABLE PROJECTION DISTANCE

(71) Applicant: CONTINENTAL AUTOMOTIVE GMBH, Hannover (DE)

(72) Inventors: Wolff von Spiegel, Bad Homburg (DE); Björn Pablo Richter, Frankfurt (DE); Willi Scheffler-Juschtschenko, Großostheim (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 331 days.

(21) Appl. No.: 17/111,637

(22) Filed: Dec. 4, 2020

(65) Prior Publication Data

US 2021/0088786 A1 Mar. 25, 2021

Related U.S. Application Data

(63) Continuation of application No. PCT/EP2019/065611, filed on Jun. 13, 2019.

(30) Foreign Application Priority Data

Jun. 15, 2018 (DE) ..................... 10 2018 209 634.1

(51) Int. Cl.
*G02B 27/01* (2006.01)
*G03H 1/02* (2006.01)

(52) U.S. Cl.
CPC ....... *G02B 27/0103* (2013.01); *G03H 1/0248* (2013.01); *G02B 2027/0125* (2013.01); *G02B 2027/0127* (2013.01)

(58) Field of Classification Search
CPC ........ G02B 27/0103; G02B 2027/0125; G02B 2027/0127; G02B 3/14; G02B 2027/0107; G02B 2027/0123; G03H 1/0248
See application file for complete search history.

(56) References Cited

U.S. PATENT DOCUMENTS

| | | | | |
|---|---|---|---|---|
| 9,715,110 | B1 * | 7/2017 | Brown | ............... G02B 27/0081 |
| 10,192,358 | B2 | 1/2019 | Robbins | |
| 10,234,696 | B2 * | 3/2019 | Popovich | .......... G02F 1/133606 |
| 2006/0132914 | A1 | 6/2006 | Weiss et al. | |

(Continued)

FOREIGN PATENT DOCUMENTS

| | | |
|---|---|---|
| CN | 104871068 A | 8/2015 |
| CN | 106842572 A | 6/2017 |

(Continued)

OTHER PUBLICATIONS

Office Action dated Dec. 27, 2021 from corresponding Chinese patent application No. 201980038163.X.

(Continued)

*Primary Examiner* — Jyotsna V Dabbi
(74) *Attorney, Agent, or Firm* — COZEN O'CONNOR

(57) ABSTRACT

A device for generating a virtual image. The device has at least one image-generating unit for producing an image and an optical waveguide for expanding an exit pupil. The optical waveguide has an output coupling region. An optical element for influencing a projection distance for at least a partial region of the virtual image is arranged adjacent to the output coupling region.

13 Claims, 5 Drawing Sheets

(56) References Cited

U.S. PATENT DOCUMENTS

| | | | | |
|---|---|---|---|---|
| 2014/0140653 A1* | 5/2014 | Brown | ................. | G02B 6/0033 |
| | | | | 385/10 |
| 2015/0160529 A1* | 6/2015 | Popovich | ............. | G02B 26/101 |
| | | | | 359/200.8 |
| 2016/0124223 A1 | 5/2016 | Shinbo et al. | | |
| 2016/0267309 A1 | 9/2016 | High et al. | | |
| 2019/0101760 A1* | 4/2019 | Ayres | ................... | G02B 6/0038 |
| 2020/0374504 A1* | 11/2020 | Taylor | ................. | H04N 13/344 |

FOREIGN PATENT DOCUMENTS

| | | |
|---|---|---|
| CN | 107533166 A | 1/2018 |
| WO | 0007061 A1 | 2/2000 |
| WO | 2016113533 A2 | 7/2016 |
| WO | 2017060665 A1 | 4/2017 |
| WO | 2017219433 A1 | 12/2017 |

OTHER PUBLICATIONS

International Search Report and Written Opinion dated Oct. 25 from corresponding International Patent Application No. PCT/EP2019/065611.

European Examination Report dated Dec. 12, 2023 from corresponding European Application No. 19731930.4.

\* cited by examiner

APPARATUS FOR GENERATING A VIRTUAL IMAGE HAVING A VARIABLE PROJECTION DISTANCE

CROSS-REFERENCE TO RELATED APPLICATIONS

This application claims priority to PCT Application PCT/EP2019/065611, filed Jun. 13, 2019, which claims priority to German Patent Application No. DE 10 2018 209 634.1, filed Jun. 15, 2018. The disclosures of the above applications are incorporated herein by reference.

FIELD OF THE INVENTION

The present invention relates to a device for generating a virtual image.

BACKGROUND OF THE INVENTION

A head-up display, also referred to as a HUD, is understood to mean a display system in which the viewer can maintain their viewing direction, since the contents to be represented are superposed into their field of view. While such systems were originally primarily used in the aerospace sector due to their complexity and cost, they are now also being used in large-scale production in the automotive sector.

Head-up displays generally consist of an image generator, an optics unit, and a mirror unit. The image generator produces the image. The optics unit directs the image onto the mirror unit. The image generator is often also referred to as an image-generating unit or PGU (Picture Generating Unit). The mirror unit is a partially reflective, light-transmissive pane. The viewer thus sees the contents represented by the image generator as a virtual image and at the same time sees the real world behind the pane. In the automotive sector, the windshield is often used as the mirror unit, and the curved shape of the windshield must be taken into account in the representation. Due to the interaction of the optics unit and the mirror unit, the virtual image is an enlarged representation of the image produced by the image generator.

The viewer can view the virtual image only from the position of what is known as the eyebox. A region whose height and width correspond to a theoretical viewing window is called an eyebox. As long as one eye of the viewer is within the eyebox, all elements of the virtual image are visible to that eye. If, on the other hand, the eye is outside the eyebox, the virtual image is only partially visible to the viewer, or not at all. The larger the eyebox is, the less restricted the viewer is in choosing their seating position.

The size of the eyebox of conventional head-up displays is limited by the size of the optics unit. One approach for enlarging the eyebox is to couple the light coming from the image-generating unit into an optical waveguide. The light that is coupled into the optical waveguide and carries the image information undergoes total internal reflection at the interfaces thereof and is thus guided within the optical waveguide. In addition, a portion of the light is in each case coupled out at a multiplicity of positions along the propagation direction, so that the image information is output distributed over the surface of the optical waveguide. Owing to the optical waveguide, the exit pupil is in this way expanded. The effective exit pupil is composed here of images of the aperture of the image generation system.

Against this background, US 2016/0124223 A1 describes a display apparatus for virtual images. The display apparatus includes an optical waveguide that causes light that is coming from an image-generating unit and is incident through a first light incidence surface to repeatedly undergo internal reflection in order to move in a first direction away from the first light incidence surface. The optical waveguide also has the effect that a portion of the light guided in the optical waveguide exits to the outside through regions of a first light exit surface that extends in the first direction. The display apparatus further includes a first light-incidence-side diffraction grating that diffracts incident light to cause the diffracted light to enter the optical waveguide, and a first light-emergent diffraction grating that diffracts the light that is incident from the optical waveguide.

With the constant further development of virtual & augmented reality technologies and applications, they are also finding their way into the automotive sector. Augmented Reality (AR), or "extended reality" in German, is the enrichment of the real world with virtual elements that are correctly registered in the three-dimensional space. Experts in German-speaking countries prefer the expression "augmented reality" over the expression "extended reality." Therefore, the expression "augmented reality" will be used in the following text.

Conventional head-up displays have a surface area in which the virtual image appears to be located. The projection distance is typically selected such that the displays appear slightly above the engine hood of the vehicle in which the head-up display is installed. There, the displays do not protrude into other objects and are easy to read.

For augmented reality applications, the use of head-up displays based on the optical waveguide technology described seems appropriate. Due to the larger eyebox, the region of the real world that can be enriched with virtual elements is likewise significantly larger. A head-up display with optical waveguides also realizes an individual projection distance, wherein a larger projection distance is useful for augmented reality applications. However, the larger projection distance is less suitable for classic displays, which are more preferred for nearer ranges.

SUMMARY OF THE INVENTION

It is an object of the present invention to propose an improved device for generating a virtual image that makes a variable projection distance possible.

This object is achieved by a device having the features described herein. Preferred embodiments of the invention are also described herein.

According to a first aspect of the invention, a device for generating a virtual image has:

an image-generating unit for producing an image;

an optical waveguide for expanding an exit pupil, wherein the optical waveguide has an output coupling region; and an optical element, arranged adjacent to the output coupling region, for influencing a projection distance for at least a partial region of the virtual image.

In the solution according to the invention, a variable projection distance is made possible by way of an additional optical element. Objects are displayed thereby at different distances for the viewer. For example, it is possible to implement augmented reality concepts with image planes at different distances for static and dynamic image information. Curved or inclined image planes may also be implemented, for example an image plane that lies on the road surface. Preferably, a first image plane lies at a distance at which stereoscopic perception by the user is possible, while a second image plane lies at a distance at which this is no longer the case. The optical element may, for example, have a diffractive structure that acts on the light exiting from the output coupling region.

According to one aspect of the invention, the optical element has at least one holographic layer. The light exiting from the output coupling region is influenced in a very controlled manner by an additional holographic layer arranged adjacent to the output coupling region. The holographic layer is preferably designed as a transmission volume hologram. In an embodiment, at least two volume holograms arranged one above the other or next to one another may be used to realize two or more projection planes.

According to one aspect of the invention, the at least one holographic layer is switchable. For this purpose, the at least one holographic layer has structures that are switchable by way of liquid crystals. In this way, it is possible to activate or deactivate the change in the projection distance by way of the holographic layer as required.

According to one aspect of the invention, the at least one holographic layer is switchable depending on a position of the viewer. For example, at least one strip-shaped volume hologram is arranged between adjacent holograms. The volume hologram may be switched depending on a position of the viewer, depending on a vertical head position. In this way, representation errors in the border area between the adjacent holograms that may occur if the head position of the viewer is not adjusted vertically may be avoided.

According to one aspect of the invention, the device has a control unit for the synchronized control of the at least one holographic layer and the image-generating unit. Different projection distances are thus realized by way of time-division multiplexing. Alternatively, it is also possible to switch between different holograms with different associated projection planes. Depending on the switching times and reserves, a plurality of image planes that the viewer may perceive quasi at the same time are realized.

According to one aspect of the invention, at least one projection plane in the near range and one projection plane in the far range are realized by way of the optical element. The projection plane in the near range may serve as a display plane, while the projection plane in the far range may serve as an augmentation plane. Since it is possible to show displays at the same time or alternately in a near range and in a far range, the requirements of classic displays and augmented reality applications may be combined.

A device according to the invention is preferably used in a mechanism of transport in order to produce a virtual image for an operator of the mechanism of transport. The mechanism of transport may be, for example, a motor vehicle or an aircraft. Of course, the solution according to the invention may also be used in other environments or for other applications, e.g. in trucks, with displays mounted in a helmet, in rail technology and in public transport, in cranes and construction machinery, etc.

Further features of the present invention will become apparent from the following description in conjunction with the figures.

Further advantages, features, and developments are gathered from the following examples, which will be explained in connection with the Figures. Identical elements or elements of the same type or with equivalent actions may be denoted by the same reference signs throughout the Figures.

DETAILED DESCRIPTION OF THE PREFERRED EMBODIMENTS

The following description of the preferred embodiment(s) is merely exemplary in nature and is in no way intended to limit the invention, its application, or uses.

For a better understanding of the principles of the present invention, embodiments of the invention will be described below in more detail with reference to the figures. The same reference signs are used in the figures for identical or functionally identical elements and are not necessarily described again for each figure. It is obvious that the invention is not restricted to the illustrated embodiments, and that the described features may also be combined or modified without departing from the scope of protection of the invention as defined herein.

Initially, the basic concept of a head-up display with an optical waveguide will be explained with reference to FIGS. 1 to 4.

Figure 1:
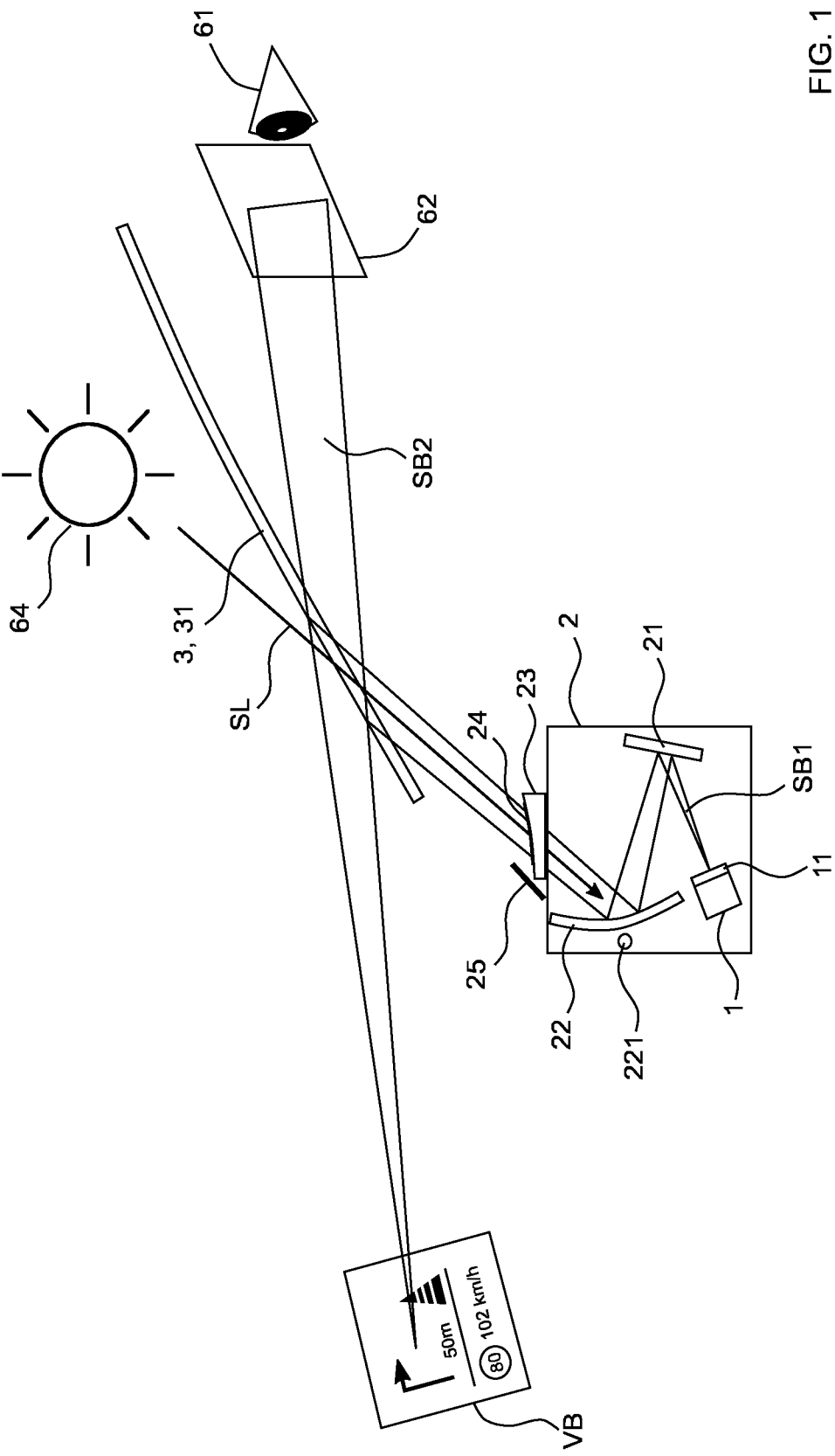
FIG. 1 schematically shows a head-up display according to the prior art for a motor vehicle.

FIG. 1 shows a schematic diagram of a head-up display according to the prior art for a motor vehicle. The head-up display has an image generator 1, an optics unit 2, and a mirror unit 3. A beam SB1 emanates from a display element 11 and is reflected by a folding mirror 21 onto a curved mirror 22 that reflects it in the direction of the mirror unit 3. The mirror unit 3 is illustrated here as a windshield 31 of a motor vehicle. From there, the beam SB2 travels in the direction of an eye 61 of a viewer.

The viewer sees a virtual image VB that is located outside the motor vehicle above the engine hood or even in front of the motor vehicle. Due to the interaction of the optics unit 2 and the mirror unit 3, the virtual image VB is an enlarged representation of the image displayed by the display element 11. A speed limit, the current vehicle speed, and navigation instructions are symbolically represented here. As long as the eye 61 is located within the eyebox 62 indicated by a rectangle, all elements of the virtual image are visible to that eye 61. If the eye 61 is outside the eyebox 62, the virtual image VB is only partially visible to the viewer, or not at all. The larger the eyebox 62 is, the less restricted the viewer is when choosing their seating position.

The curvature of the curved mirror 22 is adapted to the curvature of the windshield 31 and ensures that the image distortion is stable over the entire eyebox 62. The curved mirror 22 is rotatably mounted by use of a bearing 221. The rotation of the curved mirror 22 that is made possible thereby makes it possible to displace the eyebox 62 and thus to adapt the position of the eyebox 62 to the position of the eye 61. The folding mirror 21 serves to ensure that the path traveled by the beam SB1 between the display element 11 and the curved mirror 22 is long and, at the same time, that the optics unit 2 is nevertheless compact. The optics unit 2 is delimited with respect to the environment by a transparent cover 23. The optical elements of the optics unit 2 are thus protected for example against dust located in the interior of the vehicle. An optical film 24 or a coating that is intended to prevent incident sunlight SL from reaching the display element 11 via the mirrors 21, 22 is situated on the cover 23. The display element 11 could otherwise be temporarily or permanently damaged by the resulting development of heat. In order to prevent this, an infrared component of the sunlight SL is filtered out for example by the optical film 24. Anti-glare protection 25 serves to block incident light from the front so that it is not reflected by the cover 23 in the direction of the windshield 31, which could cause the viewer to be dazzled. In addition to the sunlight SL, the light from another stray light source 64 may also reach the display element 11.

Figure 2:
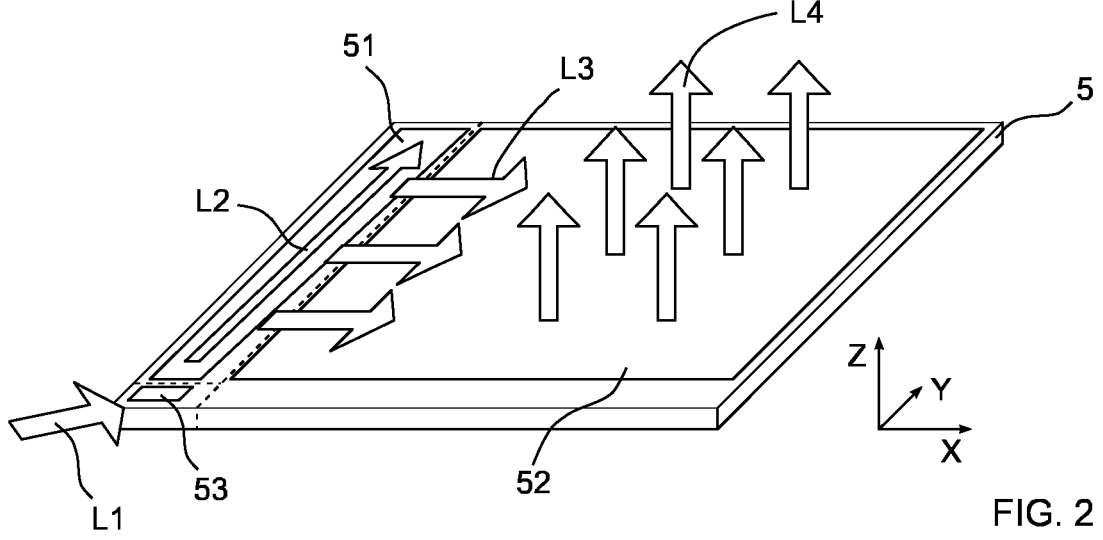
FIG. 2 shows an optical waveguide with two-dimensional enlargement.

FIG. 2 shows a schematic spatial illustration of an optical waveguide 5 with two-dimensional enlargement. In the lower left region, an input coupling hologram 53 is seen, by which light L1 coming from an image-generating unit (not shown) is coupled into the optical waveguide 5. The light propagates therein in the drawing to the top right, according to the arrow L2. In this region of the optical waveguide 5, a folding hologram 51 that acts similarly to many partially transmissive mirrors arranged one behind the other and produces a beam that is expanded in the Y-direction and propagates in the X-direction is located. This is indicated by three arrows L3. In the part of the optical waveguide 5 that extends to the right in the figure, an output coupling hologram 52 is located, which likewise acts similarly to many partially transmissive mirrors arranged one behind the other and, indicated by arrows L4, couples light upward in the Z-direction out of the optical waveguide 5. In this case, an expansion takes place in the X-direction, so that the original incident beam L1 leaves the optical waveguide 5 as a beam L4 that is enlarged in two dimensions.

Figure 3:
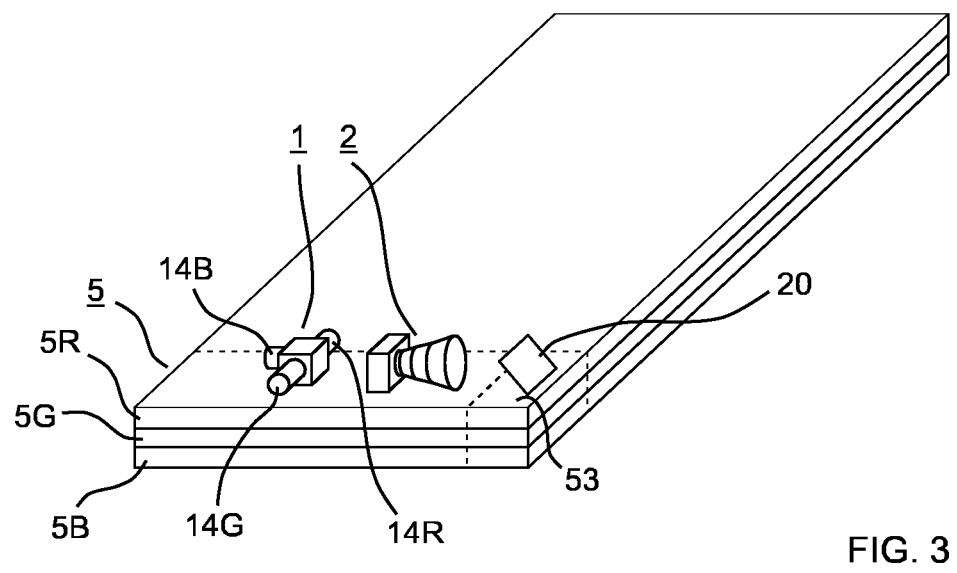
FIG. 3 schematically shows a head-up display with an optical waveguide.

FIG. 3 shows a three-dimensional illustration of a head-up display with three optical waveguides 5R, 5G, 5B, which are arranged one above the other and each stand for an elementary color red, green, and blue. Together they form the optical waveguide 5. The holograms 51, 52, 53 present in the optical waveguide 5 are wavelength-dependent, meaning that one optical waveguide 5R, 5G, 5B is used in each case for one of the elementary colors. An image generator 1 and an optics unit 2 are shown above the optical waveguide 5. The optics unit 2 has a mirror 20, by which the light produced by the image generator 1 and shaped by the optics unit 2 is deflected in the direction of the respective input coupling hologram 53. The image generator 1 has three light sources 14R, 14G, 14B for the three elementary colors. It is seen that the entire unit shown has a small overall structural height compared to its light-emitting surface.

Figure 4:
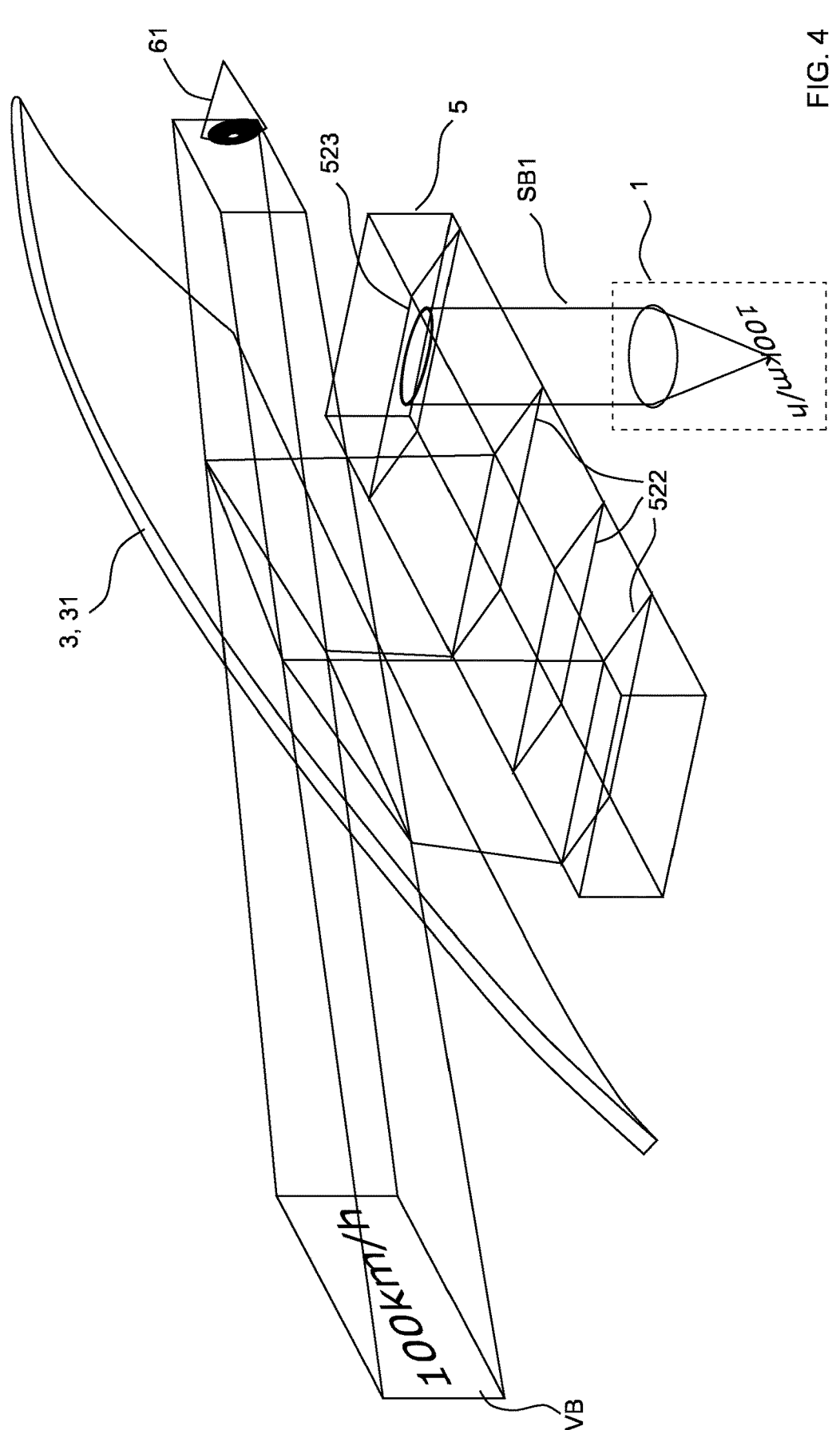
FIG. 4 schematically shows a head-up display with an optical waveguide in a motor vehicle.

FIG. 4 shows a head-up display in a motor vehicle similar to FIG. 1, except here in a three-dimensional illustration and with an optical waveguide 5. It shows the schematically indicated image generator 1, which produces a parallel beam SB1 that is coupled into the optical waveguide 5 by the mirror plane 523. The optics unit is not shown for the sake of simplicity. A plurality of mirror planes 522 each reflect a portion of the light incident on them in the direction of the windshield 31, the mirror unit 3. The light is reflected thereby in the direction of the eye 61. The viewer sees a virtual image VB above the engine hood or at an even farther distance in front of the motor vehicle.

Figure 5:
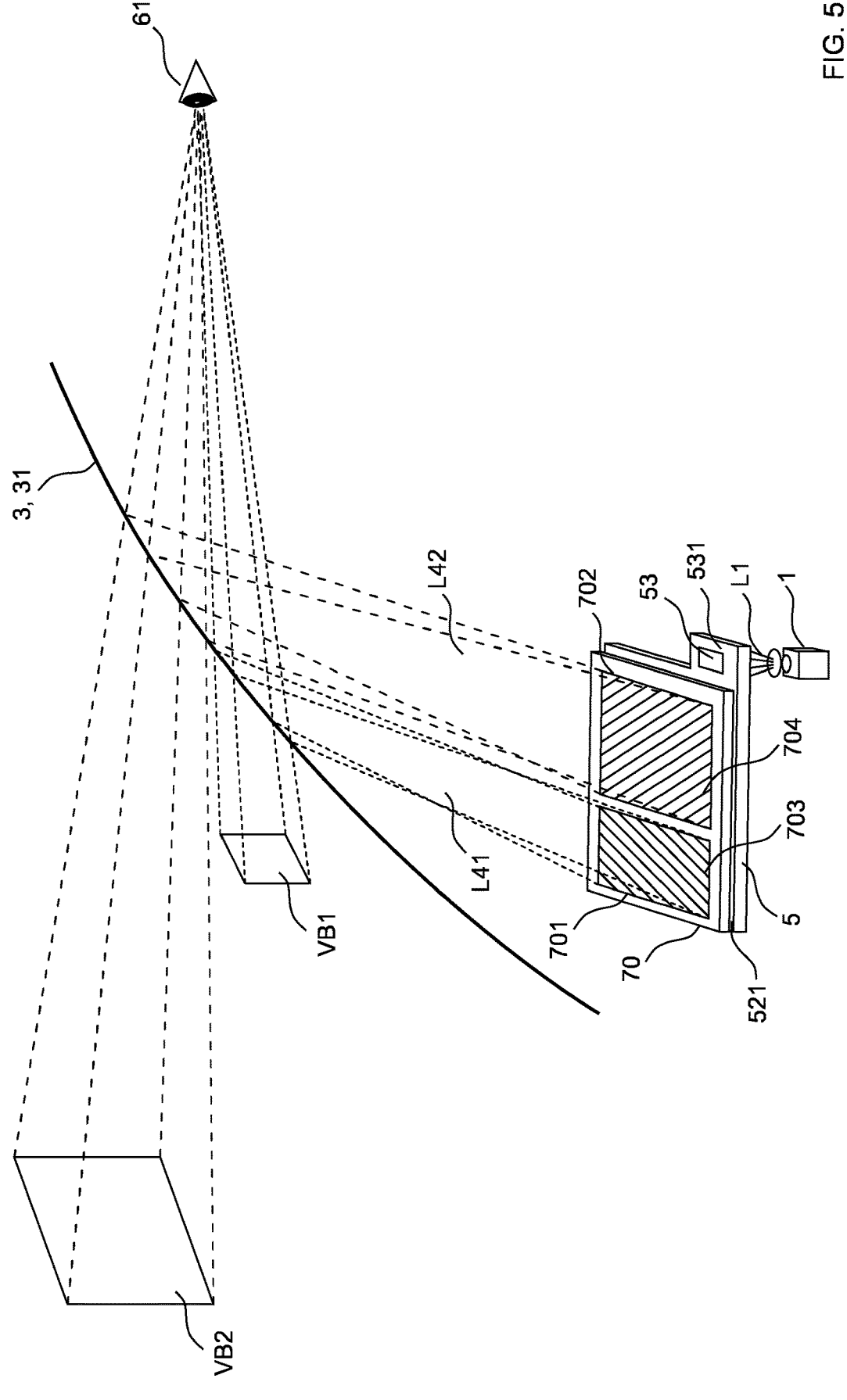
FIG. 5 schematically shows a first embodiment of a head-up display according to the invention.

FIG. 5 schematically shows a first embodiment of a head-up display according to the invention. It shows the image-generating unit 1 and the light L1 emitted thereby, which light is coupled into the optical waveguide 5 in an input coupling region 531 thereof by the input coupling hologram 53. An optical element 70, into which, for example, a diffractive structure has been introduced, is arranged above the output coupling region 521 of the optical waveguide 5. In the embodiment shown, the optical element 70 has two partial regions 701, 702 that optically influence the light passing through them in different ways. Two partial light bundles L41, L42 are seen, which lead to two virtual images VB1, VB2 located at different distances in front of the windshield 31, which acts as the mirror unit 3. A viewer 61 thus sees two displays located at different distances in front of the eyebox. The virtual image VB1 located closer to the eyebox is preferably provided for displaying vehicle information, such as the current speed, the engine speed, or the like. The virtual image VB2 further away from the eyebox may be provided for displaying information superimposed on the vehicle environment, for example directional arrows of a navigation instruction directly on the lane or other augmented reality information. In this example, the two partial regions 701, 702 have partial structures 703, 704 that do not overlap.

Figure 6:
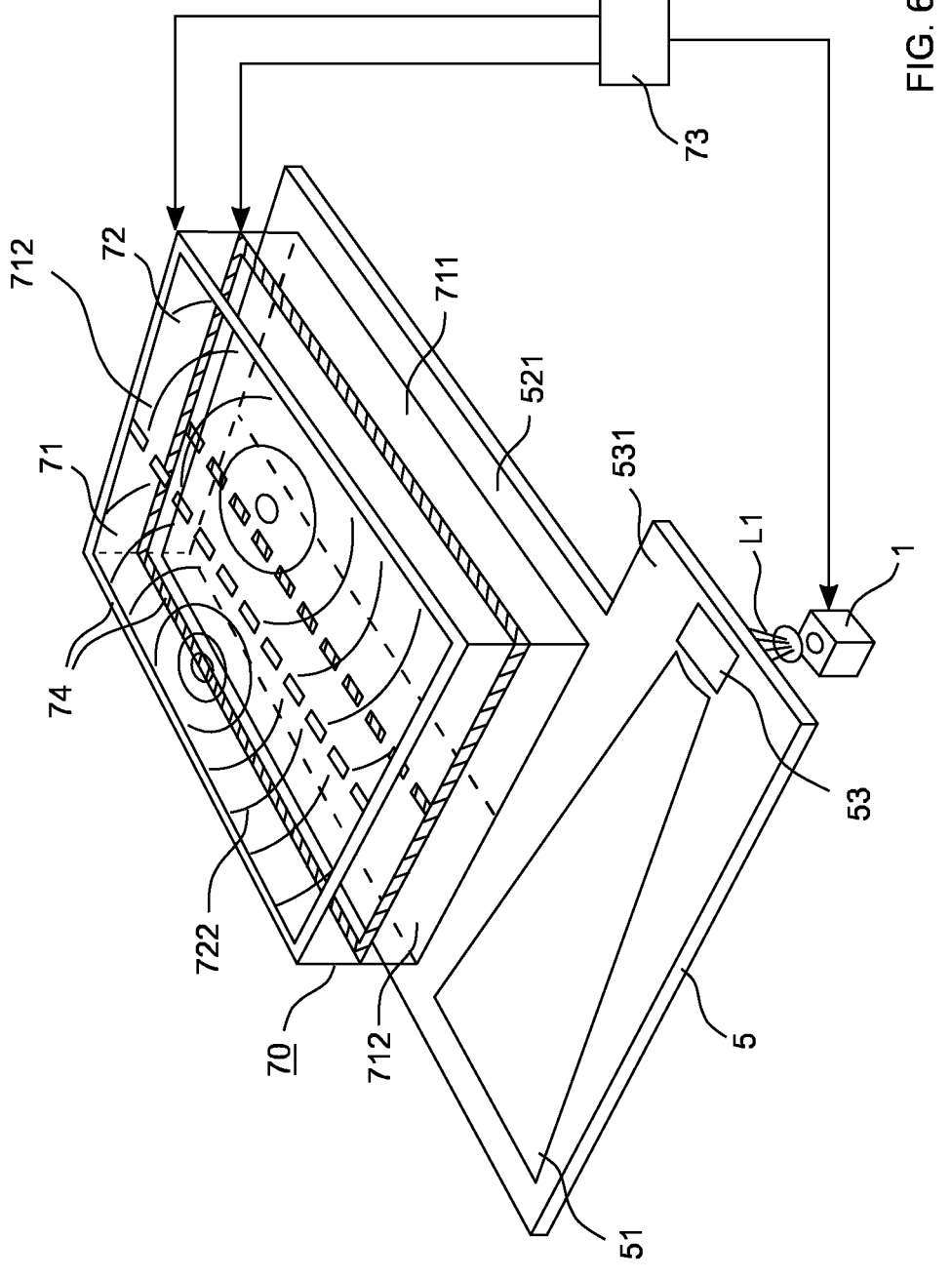
FIG. 6 schematically shows a second embodiment of a head-up display according to the invention.

FIG. 6 schematically shows a second embodiment of a head-up display according to the invention. It shows again the image-generating unit 1, the light L1 emitted thereby, the optical waveguide 5, and the optical element 70. The latter consists here of two volume holograms 71, 72 arranged next to one another, both of which are switchable. For this purpose, electrodes 74 are provided that may switch the respective volume hologram 71, 72 back and forth between an active and an inactive state. To this end, the electrodes are appropriately controlled by a control unit 73. The hologram structures 712, 722 that are at one time point located in non-overlapping partial regions 711, 721 and have been switched to be active are seen. The hologram structures that have been switched to be active are indicated by way of lines in the shape of partial circles. The control unit 73 also controls the image-generating unit 1 in such a way that the image produced thereby is switched synchronously with the switched volume holograms 71, 72. If further volume holograms are present, these are advantageously set to different distances and are switched synchronously with the desired distance of the information to be represented. In this way, virtual images may be represented, possibly not simultaneously but at least one after the other, or changing virtual images may be displayed at different intervals. If the switching times are sufficiently short, it is also possible to realize a plurality of image planes that the viewer may perceive quasi simultaneously.

According to a first variant, each of the volume holograms 71, 72 covers the entire used surface area of the output coupling region 521, that is to say the volume holograms 71, 72 are arranged one above the other in this case. The volume holograms 71, 72 are then switched to active preferably in alternation or simultaneously in different combinations. It is likewise possible for a first volume hologram 71, 72 to be permanently active and, for example, be designed for a projection distance of 5 m. In this case, it is not necessarily designed to be switchable. The second volume hologram 71, 72 may then be switched on in addition and is designed in such a way that it effects a change in the projection distance to 7.5 m, for example. This variant may also be implemented in such a way that the second volume hologram 71, 72 overlaps with the first volume hologram 71, 72 only in a partial region.

According to a further variant, at least one further strip-shaped volume hologram is arranged between the volume holograms 71, 72 that are arranged next to one another. The volume hologram may be switched depending on a position of the viewer, depending on a vertical head position. With the at least one strip-shaped volume hologram, representation errors in the border area between the volume holograms 71, 72 possibly resulting from a deviation in the vertical head position of the viewer may be avoided.

According to another variant, provision is made that only a respective part of the volume holograms 71, 72 is switched to active and the other part to inactive. Appropriate electrode geometries are provided for this purpose.

The description of the invention is merely exemplary in nature and, thus, variations that do not depart from the gist of the invention are intended to be within the scope of the invention. Such variations are not to be regarded as a departure from the spirit and scope of the invention.

LIST OF REFERENCE SIGNS

1 Image generator/image-generating unit
11 Display element
14, 14R, Light source
14G, 14B
2 Optics unit
20 Mirror
21 Folding mirror
22 Curved mirror
221 Bearing
23 Transparent cover
24 Optical film
25 Anti-glare protection
3 Mirror unit
31 Windshield
5 Optical waveguide
51 Folding hologram
52 Output coupling hologram
521 Output coupling region
522 Mirror plane
523 Mirror plane
53 Input coupling hologram
531 Input coupling region
61 Eye/viewer
62 Eyebox
64 Stray light source
70 Optical element
701, 702 Partial region
703, 704 Partial structure
71, 72 Volume hologram
711, 721 Partial region
712, 722 Hologram structure
73 Control unit
74 Electrode
L1 . . . L4 Light
L41, L42
SB1, SB2 Beam bundle
SL Sunlight
VB, VB1, Virtual image
VB2

What is claimed is:

1. A non-wearable device for generating a virtual image in a vehicle, comprising:

an image-generating unit located in the vehicle for producing an image;
an optical waveguide for expanding an exit pupil;
an output coupling region being part of the optical waveguide;
an optical element for influencing a projection distance for at least a partial region of the virtual image is arranged adjacent to the output coupling region, wherein the optical element has at least two volume holograms arranged next to one another and at different vertical heights with respect to the output coupling region, and wherein at least one projection plane in a near range and at least one projection plane in a far range are realized at the same time by way of the optical element; and
at least one strip-shaped volume hologram wherein the strip-shaped volume hologram is arranged between the at least two volume holograms that are arranged next to one another.

2. The device of claim 1, the optical element further comprising at least one holographic layer.

3. The device of claim 2, wherein the at least one holographic layer is switchable.

4. The device of claim 3, wherein the at least one holographic layer is switchable depending on a position of the viewer.

5. The device of claim 4, further comprising a control unit for the synchronized control of the at least one holographic layer and the image-generating unit.

6. The device of claim 3, the at least one holographic layer further comprising structures that are switchable by way of liquid crystals.

7. The device of claim 1, the projection plane further comprising a display plane in the near range and the projection plane serves as an augmentation plane in the far range.

8. The device of claim 1, wherein the at least one strip-shaped volume hologram partially horizontally overlaps at least one of the at least two volume holograms arranged next to one another.

9. The device of claim 1, wherein the volume holograms are switched synchronously with the desired distance of the information to be represented.

10. A means of transport vehicle having a non-wearable device for generating a virtual image, comprising:

an image-generating unit located in the vehicle for producing an image;
an optical waveguide for expanding an exit pupil;
an output coupling region being part of the optical waveguide;
an optical element for influencing a projection distance for at least a partial region of the virtual image is arranged adjacent to the output coupling region, wherein the optical element has at least two volume holograms arranged next to one another and at different vertical heights with respect to the output coupling region, and wherein at least one projection plane in a near range and at least one projection plane in a far range are realized at the same time by way of the optical element; and
at least one strip-shaped volume hologram wherein the strip-shaped volume hologram is arranged between the at least two volume holograms that are arranged next to one another,
wherein the non-wearable device generates a virtual image for an operator of the means of transport vehicle.

11. The device of claim 10, wherein the strip-shaped volume hologram is arranged vertically between the at least two volume holograms that are arranged next to one another.

12. The device of claim 10, wherein the volume holograms are switched synchronously with the desired distance of the information to be represented.

13. A non-wearable device configured to generate a virtual image in a vehicle, comprising:

an image-generating unit located in the vehicle for producing an image;

an optical waveguide for expanding an exit pupil;

an output coupling region being part of the optical waveguide;

an optical element for influencing a projection distance for at least a partial region of the virtual image is arranged adjacent to the output coupling region, wherein the optical element has at least two volume holograms arranged next to one another at different vertical heights with respect to the output coupling region, and wherein at least one projection plane in a near range and at least one projection plane in a far range are realized at the same time by way of the optical element; and at least one strip-shaped volume hologram wherein the strip-shaped volume hologram is arranged between the at least two volume holograms that are arranged next to one another, wherein the strip-shaped volume hologram is arranged vertically between the at least two volume holograms that are arranged next to one another.

\* \* \* \* \*